N. SALMON & A. DELAVIERE.
Shirt or Sleeve Stud.

No. 204,095.　　　　Patented May 21, 1878.

Witnesses:
Chandler Hall.
Thomas E. Birch.

Inventors:
Narcisse Salmon
Albert Delaviere
by their Attorney
Edwin H. Brown.

UNITED STATES PATENT OFFICE.

NARCISSE SALMON AND ALBERT DELAVIÉRE, OF PARIS, FRANCE.

IMPROVEMENT IN SHIRT OR SLEEVE STUDS.

Specification forming part of Letters Patent No. 204,095, dated May 21, 1878; application filed October 3, 1877.

*To all whom it may concern:*

Be it known that we, NARCISSE SALMON and ALBERT DELAVIÉRE, of Paris, France, have invented certain new and useful Improvements in Shirt or Sleeve Studs, of which the following is a specification:

Our improvements consist in the combination, with a shirt or sleeve stud having a fixed part and a movable part, which, after being inserted in a button-hole, may be turned at right angles to the fixed part to retain it in place, of a spring so arranged as to hold the fixed and movable parts so tightly in contact as to preclude the movable part turning accidentally, and inclines so arranged that in order to turn the movable part it is necessary to exert a force sufficient to deflect said spring.

It also consists in details of construction, to be hereinafter described.

Figure 1:
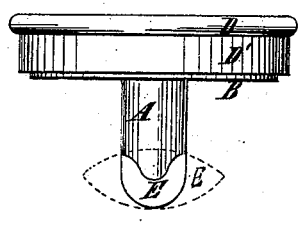
Figure 3:
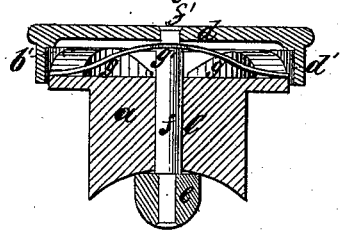
Figure 2:
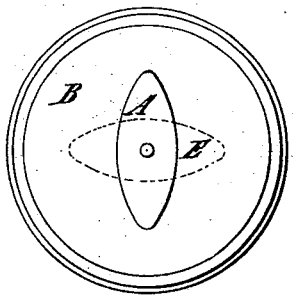
Figure 4:
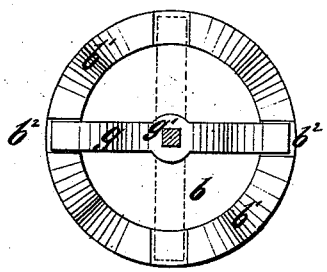

In the accompanying drawing, Figure 1 represents a side elevation of a shirt or sleeve stud embodying our improvements. Fig. 2 is a plan of the under side thereof. Fig. 3 is a vertical section thereof; and Fig. 4 is a plan view with the head or face piece of the stud removed.

Similar letters of reference designate corresponding parts in all the figures.

A $a$ designates the shank of the stud, which is shown as of oblong shape, to admit of its easy insertion in a button-hole. The lower end of this shank is preferably curved to correspond with the curvature of a cuff when on the wrist; and its upper end is shown as provided with a circular disk or plate, B $b$. Passing through the shank A $a$ and fitting loosely therein is a spindle, $f$, to the inner end of which is secured a movable cross-bar, E $e$, which is similar in outline to the shank of the stud, and which is preferably rounded on its inner face to correspond with the curvature of the shank A $a$, and so that it may be readily turned within a cuff.

To the outer end of the spindle $f$ is firmly fastened the head or face piece of the stud, which is shown as consisting of a disk or plate, D $d$, to which is attached a rim, D' $d'$, which projects inward and over the plate or disk B $b$, thus concealing it from view and presenting an ornamental finish.

The face or front of the stud may be ornamented or embellished in any way to suit the taste of the wearer.

Between the plate or disk B $b$ and the face or front of the stud is placed a spring, $g$, which I have shown as rigidly attached to the spindle $f$, so as to revolve with it. The ends of this spring bear upon inclines $b^1$ mounted upon the face of the disk or plate B $b$. Between these inclines are notches $b^2$, wherein the ends of the spring $g$ rest, and from which it requires some slight exertion to remove them, thus precluding the cross-bar from accidental movement, and preventing the loss of the stud.

To insert the stud in a button-hole, the cross-bar E $e$ is turned parallel with the shank A $a$, and inserted in the button-hole, after which the said cross-bar is turned at right angles to the shank to retain it in place, and the ends of the spring rest between the inclines, or at the lowest part.

What we claim as our invention, and desire to secure by Letters Patent, is—

A shirt or sleeve stud or button comprising the combination of a shank for insertion in a button-hole, a cross-bar and spring connected rigidly by a spindle, and deflecting inclines mounted upon the said shank, whereby the cross-bar is precluded from moving without deflecting the spring and is held against the shank, substantially as and for the purpose set forth.

In testimony that we claim the foregoing we have hereunto set our hands this 10th day of September, 1877.

SALMON.
                A. DELAVIÉRE.

Witnesses:
    J. BARDI,
    DAVID T. S. FULLER.